US 6,575,653 B1

(12) United States Patent
Kräuter

(10) Patent No.: US 6,575,653 B1
(45) Date of Patent: Jun. 10, 2003

(54) JOINTED SUPPORT STRUCTURE

(75) Inventor: Josef Kräuter, Nendingen (DE)

(73) Assignee: Geomed Medizen-Technik GmbH & Co., Tuttlingen (DE)

( * ) Notice: Subject to any disclaimer, the term of this patent is extended or adjusted under 35 U.S.C. 154(b) by 74 days.

(21) Appl. No.: 09/705,567

(22) Filed: Nov. 3, 2000

(30) Foreign Application Priority Data

Nov. 12, 1999 (DE) .......................................... 199 54 615
May 11, 2000 (EP) ............................................. 00109996

(51) Int. Cl.$^7$ .............................. F16C 11/06; E04G 3/00
(52) U.S. Cl. ....................................... 403/55; 248/276.1
(58) Field of Search .............................. 403/55, 56, 63, 403/90, 122; 248/122, 286.5, 276.1

(56) References Cited

U.S. PATENT DOCUMENTS

| 3,240,516 A | 3/1966 | Barish et al. .................. 187/12 |
| 3,910,538 A | 10/1975 | Baitella ....................... 248/122 |
| 4,236,844 A | 12/1980 | Mantele ........................ 403/55 |
| 4,491,435 A | 1/1985 | Meier .......................... 403/55 |

FOREIGN PATENT DOCUMENTS

| CH | 608 874 A | 1/1979 |
| CH | 678097 | 7/1991 |
| DE | 207 363 C | 3/1909 |
| DE | 2 419 637 | 4/1974 |
| DE | 27 17 828 A | 4/1977 |

Primary Examiner—Robert E. Pezzuto
(74) Attorney, Agent, or Firm—Fitch, Even, Tabin & Flannery

(57) ABSTRACT

The invention relates to a jointed support structure, in particular for the adjustable attachment of objects, such as medical instruments, to a support, such as a surgical operating table, comprising at least one clamping element having a movable clamping jaw; at least one elongate connecting element connected at one end to the clamping element and preferably made as a tube; an actuating block connected to the other end of the connecting element; at least one push rod extending at least substantially parallel to the connecting element and connecting the clamping jaw and the actuating block in a thrust transmitting manner; a movement generating device generating a movement extending at least substantially perpendicular to the push rod; and a transmission mechanism which guides the motion generated by the movement generating device while preferably deflecting it through 90° to the push rod, whereby the clamping jaw can be brought alternately into and out of clamping engagement. The transmission mechanism comprises a toggle lever mechanism having first and second toggle levers connected at a joint movable by the movement generating device to move the toggle levers and the push rod to effect clamping of the clamping jaw.

34 Claims, 20 Drawing Sheets

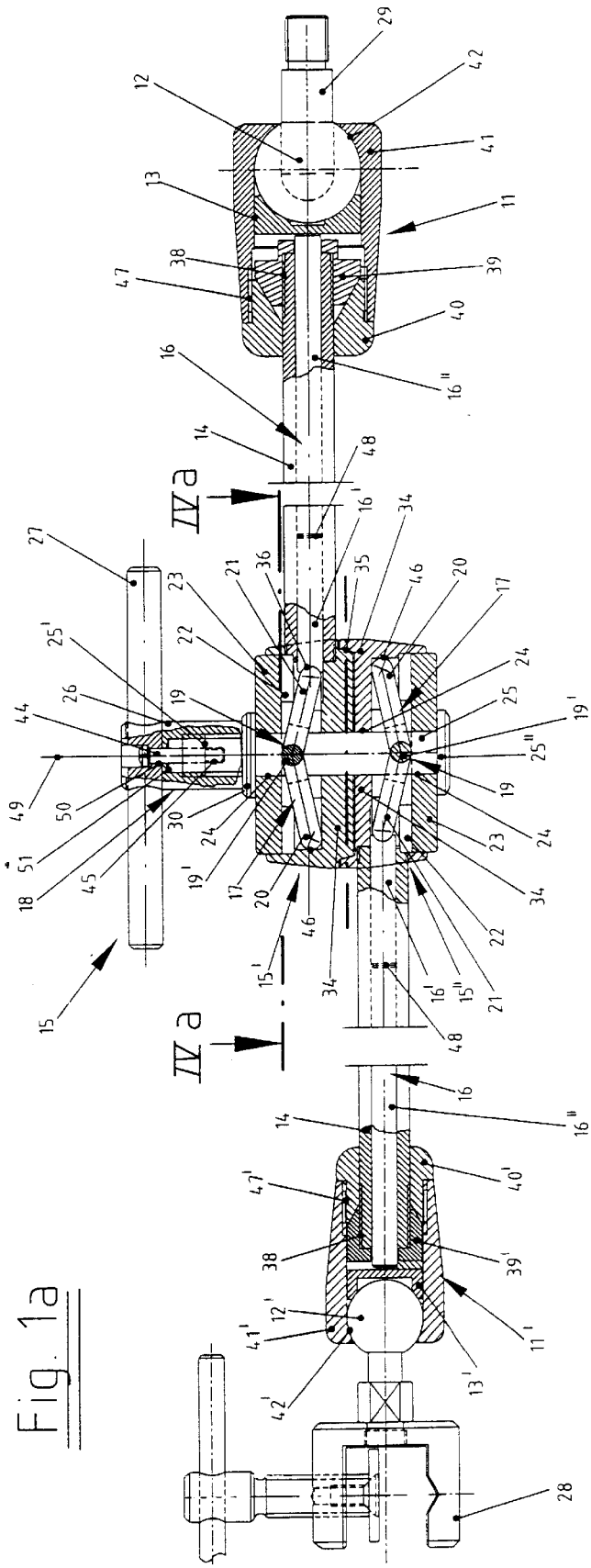

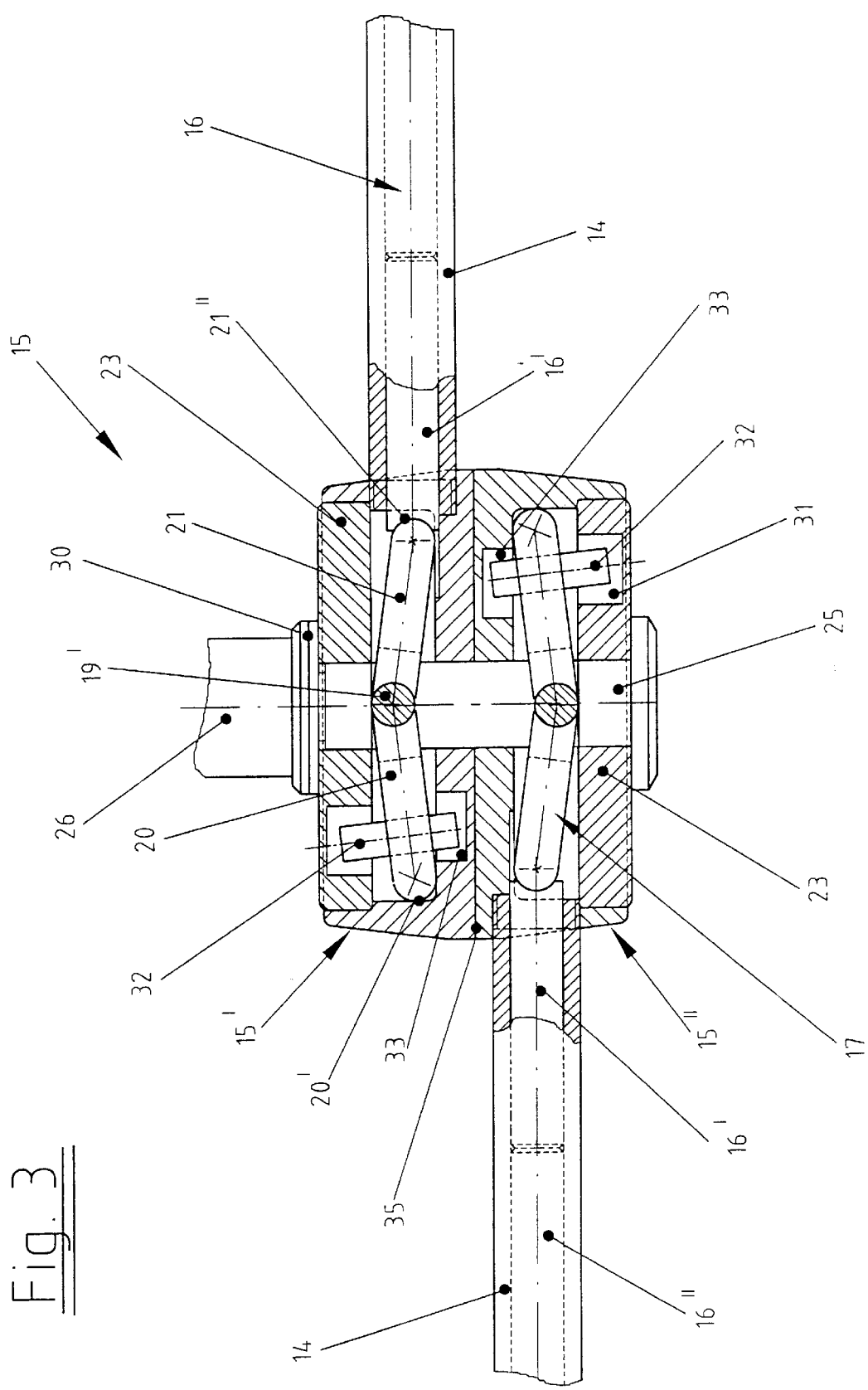

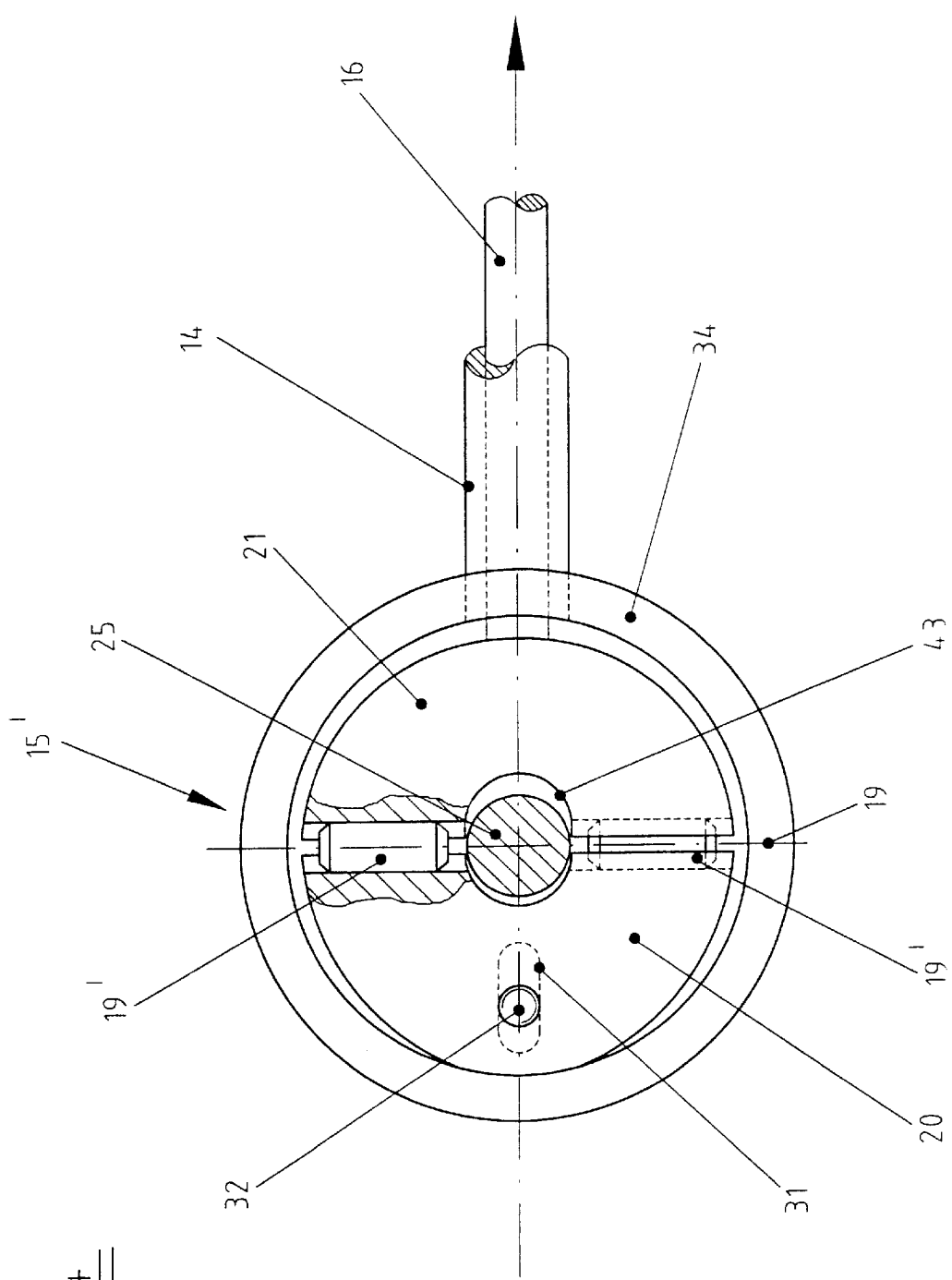

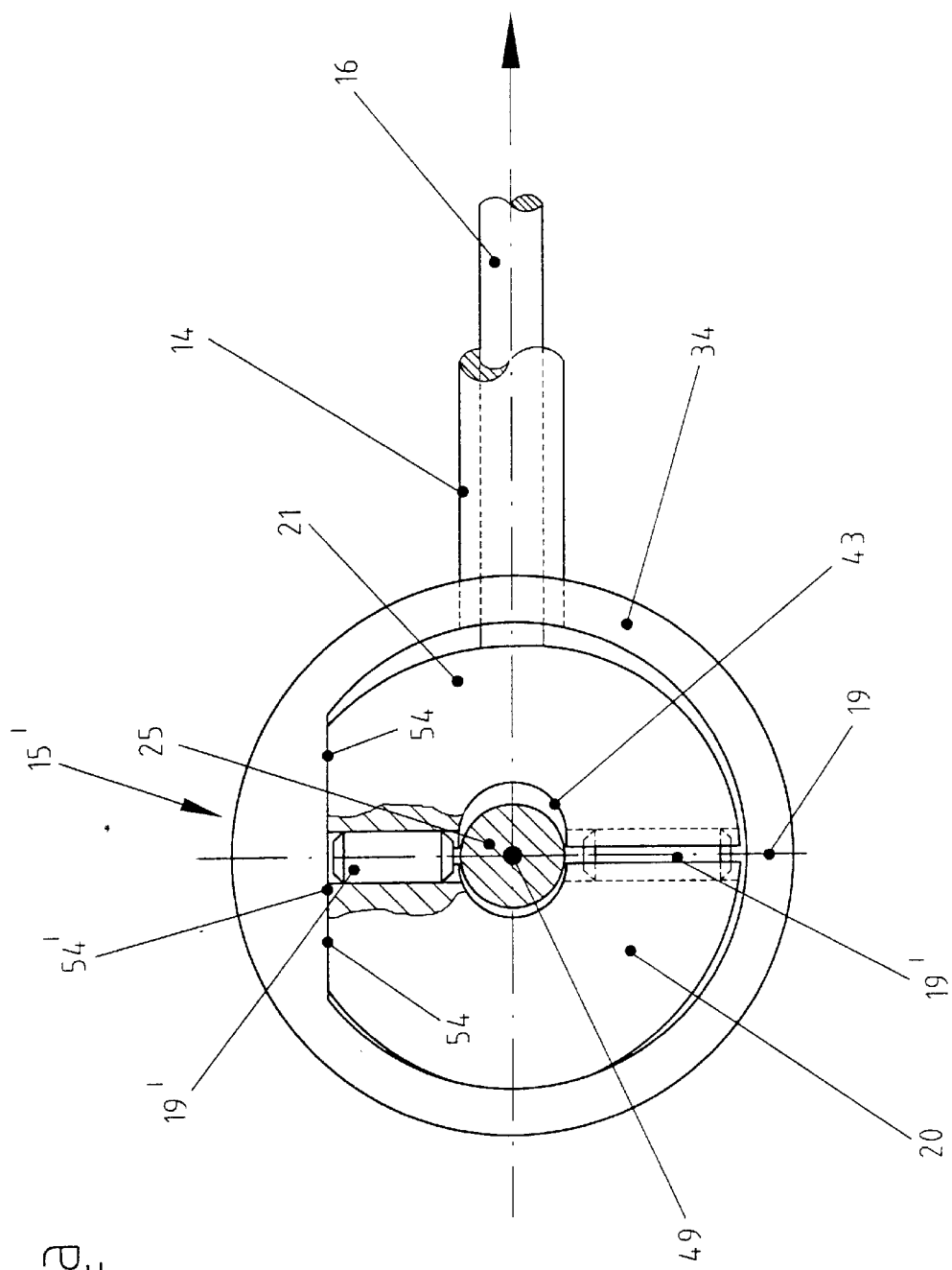

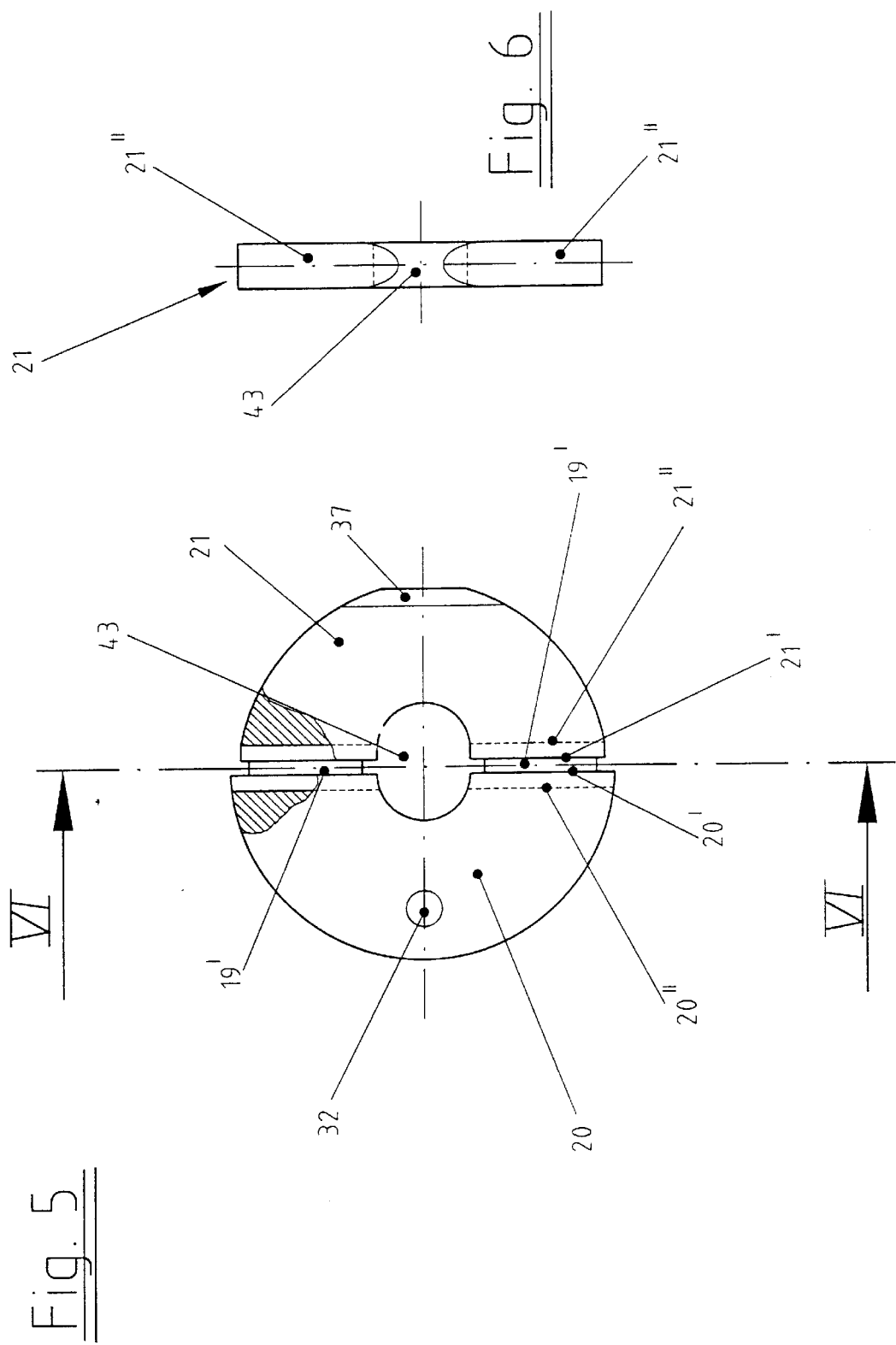

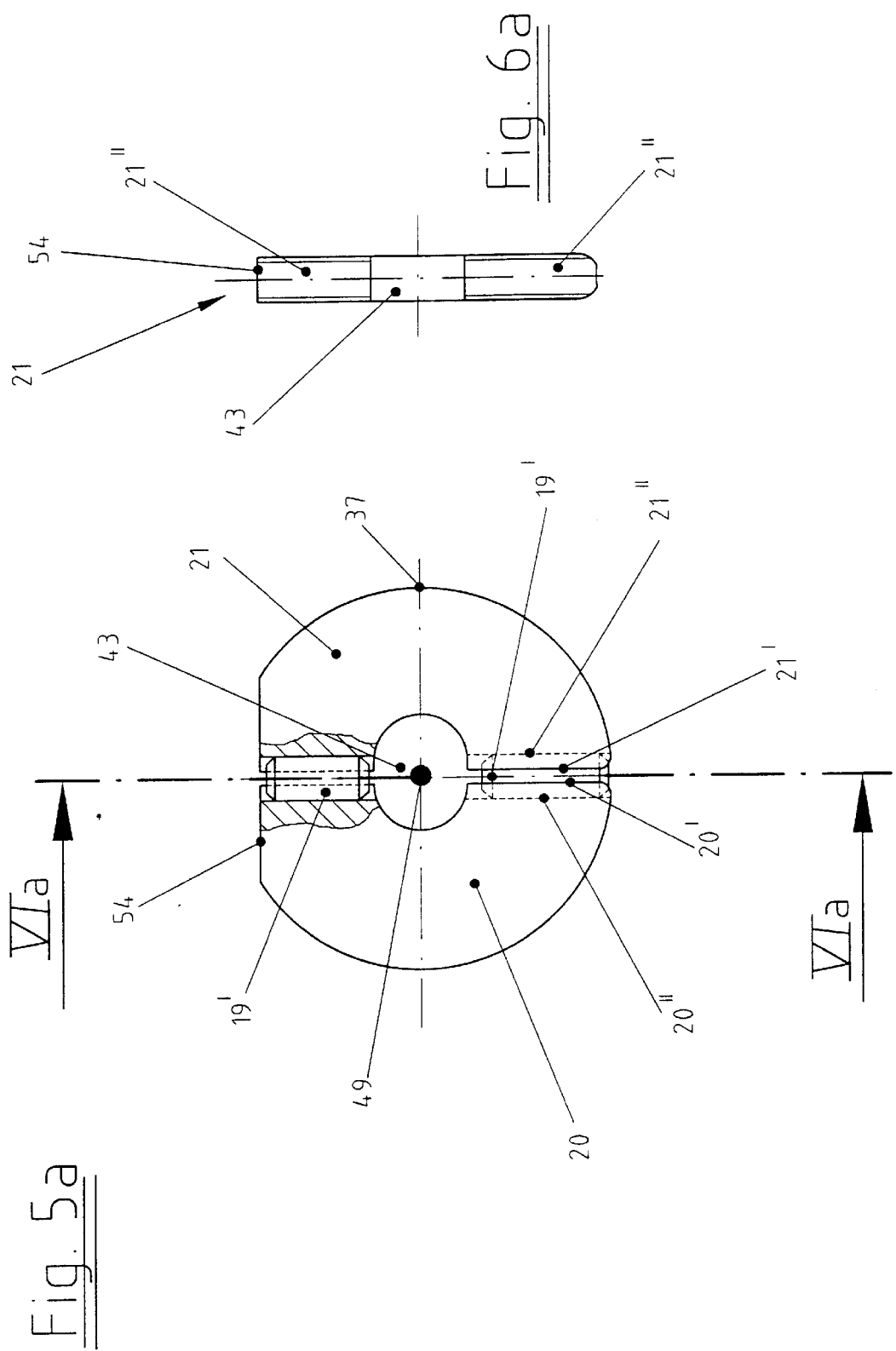

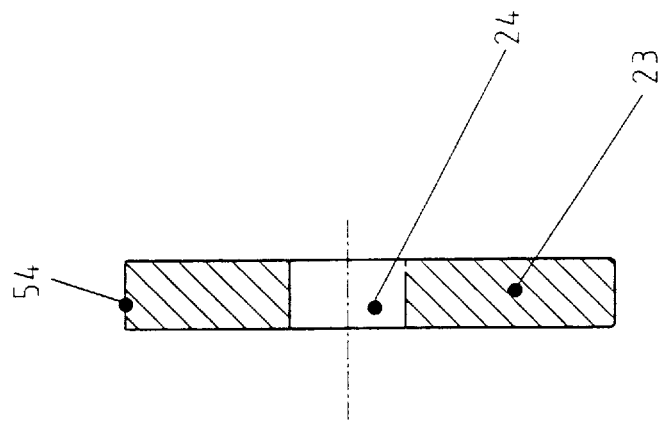
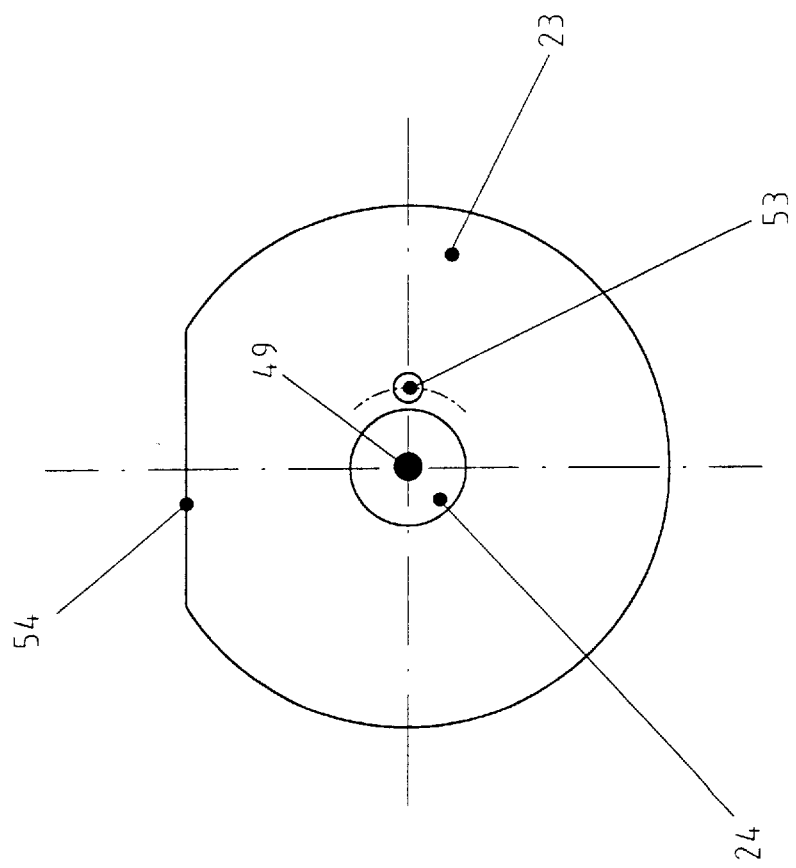

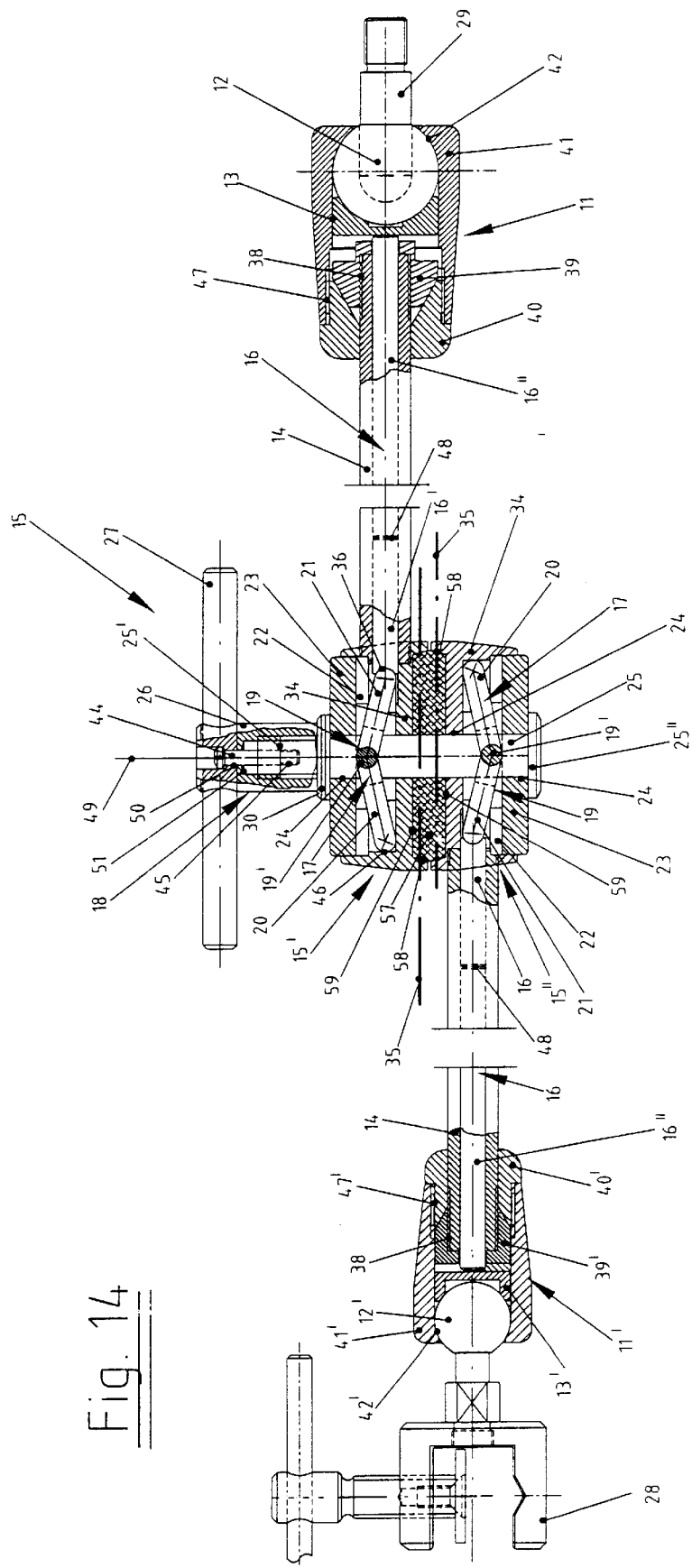

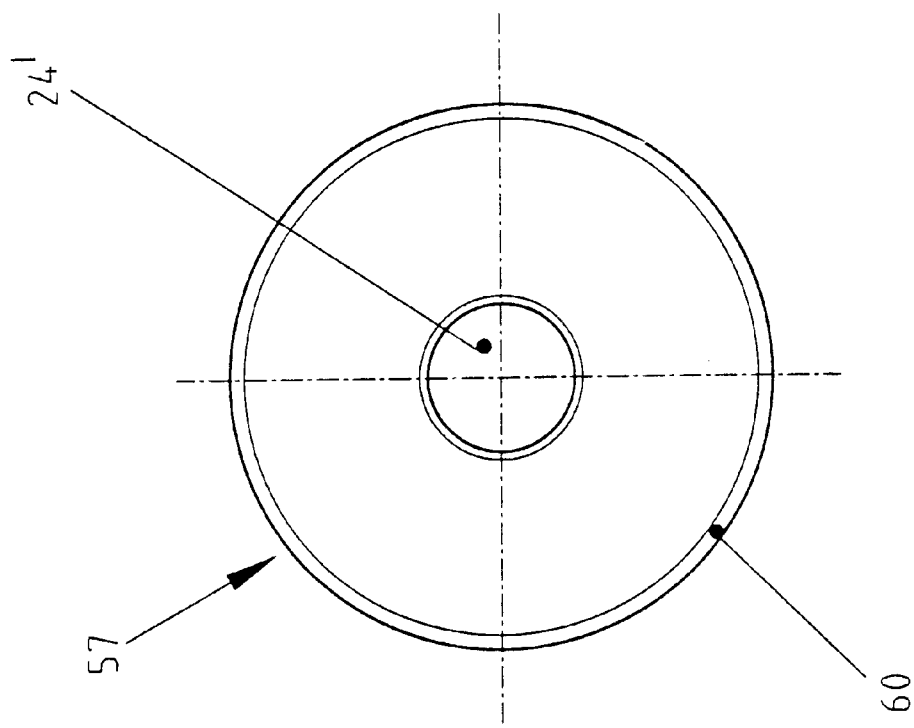
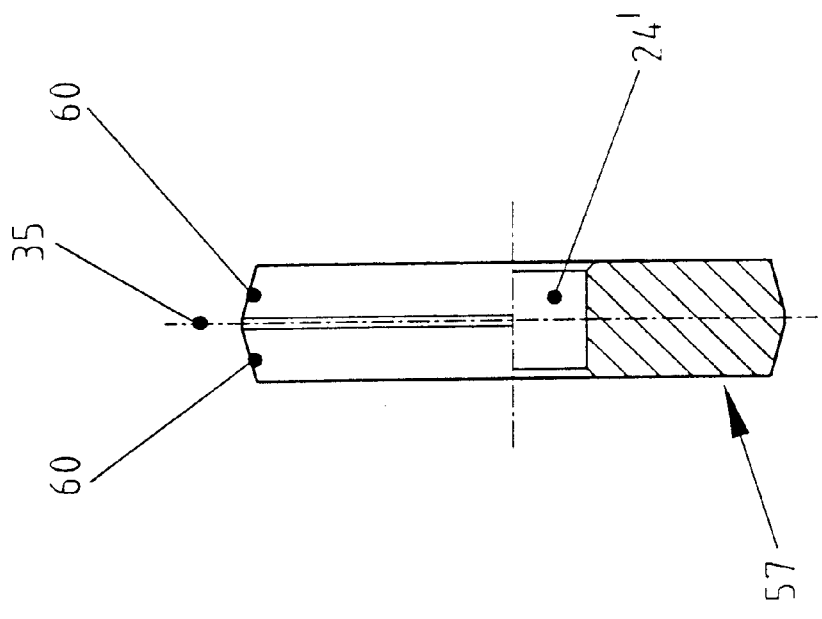

JOINTED SUPPORT STRUCTURE

FIELD

The invention relates to a jointed support structure in accordance with the preamble of claim 1.

BACKGROUND

Such a jointed support structure, also known as an arm system, is used, for example, when surgical operation areas have to be kept free for or accessible to the surgeon for a longer period. The surgical assistants are relieved in this way and can carry out other work. Such jointed support structures are used to special advantage with operations on hip joints, the abdomen, thorax, mamma and femur. They can also serve as holders in the endoscopy field. The jointed support structure is generally fastened to an operating table rail via a fastening rod and a fastening vice. After a suitable longitudinal displacement and/or horizontal adjustment, surgical aids such as valves or holders are fastened in the mounting provided at the other end of the jointed support structure, preferably as a screw clamp apparatus, and fixed in place via the movement generating device by tightening the central joint. Such jointed support structures can be used as holders in the anaesthetic or intensive care fields or in the minimum invasive field.

In a jointed support structure known from German patent DE 27 17 828, the transmission mechanism is formed by a ball arranged in a wedge-shaped recess which converts an axially applied clamping force into a displacement of the push rod. It is disadvantageous with this known jointed support structure that a substantial amount of force is required on the sides of the movement generating device for the clamping force generated in the clamping jaw element. Furthermore, when the torque is reduced to release the clamping jaw, self-locking can occur so that the release of the clamping is not reliably ensured. Finally, the path reserve of the transmission mechanism of the known jointed support structure is relatively low. A further embodiment operates with a spring plate centrally subject to the pressure of the movement generating device and exerting pressure by its ends on the push rod or the housing of the actuating block. The disadvantage here is that substantial forces are required to exert pressure on the push rod, in particular with an increasing deflection of the spring plate.

A jointed support structure which operates with only one toggle lever has also become known (Swiss patent CH 678 097) which has the disadvantage that the reaction force exerted on a conical nut by the toggle lever results in substantial friction forces between the collet and the surrounding housing, which allows self-locking on the one hand and makes the actuation of the jointed support structure more difficult on the other.

It is the object of the invention to provide a jointed support structure of the kind first mentioned in which
 a specific clamping force can be achieved in the clamping jaw element with a reduced expenditure of force at the actuating block;
 a self-locking of the transmission mechanism is not to be expected when the actuating force falls off; and
 a larger path reserve is available.

The features of the characterising part of claim 1 are provided to satisfy this object.

SUMMARY

The path generating device and the toggle lever mechanism are to be made and arranged in such a way that when the largest path is set with the path generating device, the toggle lever is just not yet fully extended so that when the actuating force falls off, a reliable relaxation, i.e. the movement of the toggle lever mechanism into a position with a greater angle, i.e. an unclamping free of self-locking, is ensured.

Moreover, a greater path reserve is also made available due to the toggle lever mechanism, whereby any changes in length of the individual components due to material fatigue and the resulted dreaded loss in clamping power is compensated and/or countered. In this way, overhauls or repairs of the jointed support structure due to a substantial reduction in or loss of the clamping force are avoided.

A clamping force approximately ⅔ higher than the state of the art can be achieved on the basis of the invention with a lower tightening torque or release torque for the same construction and size. In this way, the scope of application and use of the jointed support structure, which is particularly in the field of medical technology, is substantially expanded.

The embodiment of claim 2 has the advantage that the toggle lever system only acts on a single push rod and that a clear relation exists between the movement generating device and the clamping procedure.

The embodiments in accordance with claims 3 and 4 are of particular advantage as, in this way, a particularly stable toggle lever mechanism is achieved which can be manufactured and assembled economically and which can be ideally accommodated in a space-spacing manner in the actuating block, which preferably has a circular horizontal cross section.

Expedient practical developments of the invention can be found in the claims 5 to 12.

The embodiment of claim 13 is particularly advantageous as, in this way, two clamping jaw elements are provided which are connected to one another by the tubular connection elements and the actuating block with one of the clamping jaw elements, for example, being fastened in a suitable manner to the operating table while the other end carries the required medical instruments and/or apparatus.

The two housings can contact one another frictionally and are pressed more or less against one another when the movement generating device is actuated. A respective embodiment is defined in claim 14.

The further developments in accordance with claims 15 to 18 are, however, particularly advantageous because, in this way, the friction between the two housings clamped relative to one another can be increased in a desirable manner. As the reduction in force achieved by the toggle lever arrangement in accordance with the invention also reduces the clamping force between the two housings contacting one another, it is expedient to increase the friction forces between the two housings by the respective measures.

The sliding insert can furthermore prevent metal from rubbing on metal, whereby seizing could occur. The sliding insert can be made, for example, of a suitable plastic material in order, in connection with its special dual tapering shape, to avoid seizing on a relative rotation of the two housings, on the one hand, but also to make available the required friction force, on the other hand, so that after the stressing of the two push rods a relative rotation of the two housings is reliably avoided.

A further development is characterised by claim 19.

The preferred embodiment of the connection element as a tube can be seen from claim 20.

The embodiment in accordance with claim 21 is useful to counter a relative rotation between the pressure plate, housing and toggle levers. Two advantageous embodiments for the rotational security can be seen from claim 22.

A particularly good, low-friction force transmission between the toggle lever mechanism and the push rod is achieved by the measure in accordance with claim 23.

An optimum length adaptation of the push rods to a particular problem can be achieved easily in accordance with claim 24. In addition, various tube connection elements of different length are to be made available. An appropriate arrangement and design of the clamping jaw elements can be seen from claim 25.

BRIEF DESCRIPTION OF THE DRAWINGS

The invention is described in the following by way of example with reference to the drawing in which are shown:

FIG. 1a a corresponding side view of a further embodiment;

FIG. 3 a view of the middle part of the object of FIG. 1 in the clamped state;

FIG. 4 a schematic sectional view according to line IV—IV in FIG. 1;

FIG. 4a a schematic sectional view according to line IVa—IVa in FIG. 1a;

FIG. 5 an enlarged top view of the toggle lever plates connected by pressure rollers of the embodiment in accordance with FIGS. 1, 2, 3 and 4;

FIG. 5a an enlarged top view of the toggle lever plates of the embodiment in accordance with FIGS. 1a, 2a, 3a and 4a connected by pressure rollers;

FIG. 6 a schematic view according to line VI—IV in FIG. 5;

FIG. 6a a schematic view according to line VIa—IVa in FIG. 5a;

FIG. 8a a vertical section through a pressure plate of the embodiment in accordance with the invention according to FIGS. 1a, 2a, 3a, 4a, 5a, 6a and 7a.

FIG. 9a a view of the object of FIG. 8a from the left;

FIG. 11a a partly sectioned top view of the object of FIG. 10a;

FIG. 14 a side view partly sectioned analogue to FIGS. 1 and 1a of a further embodiment of the jointed support structure in accordance with the invention;

FIG. 15 a partly sectioned side view of the sliding insert using in the embodiment in accordance with FIG. 14:

FIG. 16 a view of the object of FIG. 15 from the left; and

FIG. 17 a partly sectioned, enlarged section of FIG. 14 analogue to FIGS. 2, 2a.

DETAILED DESCRIPTION

Figure 1:
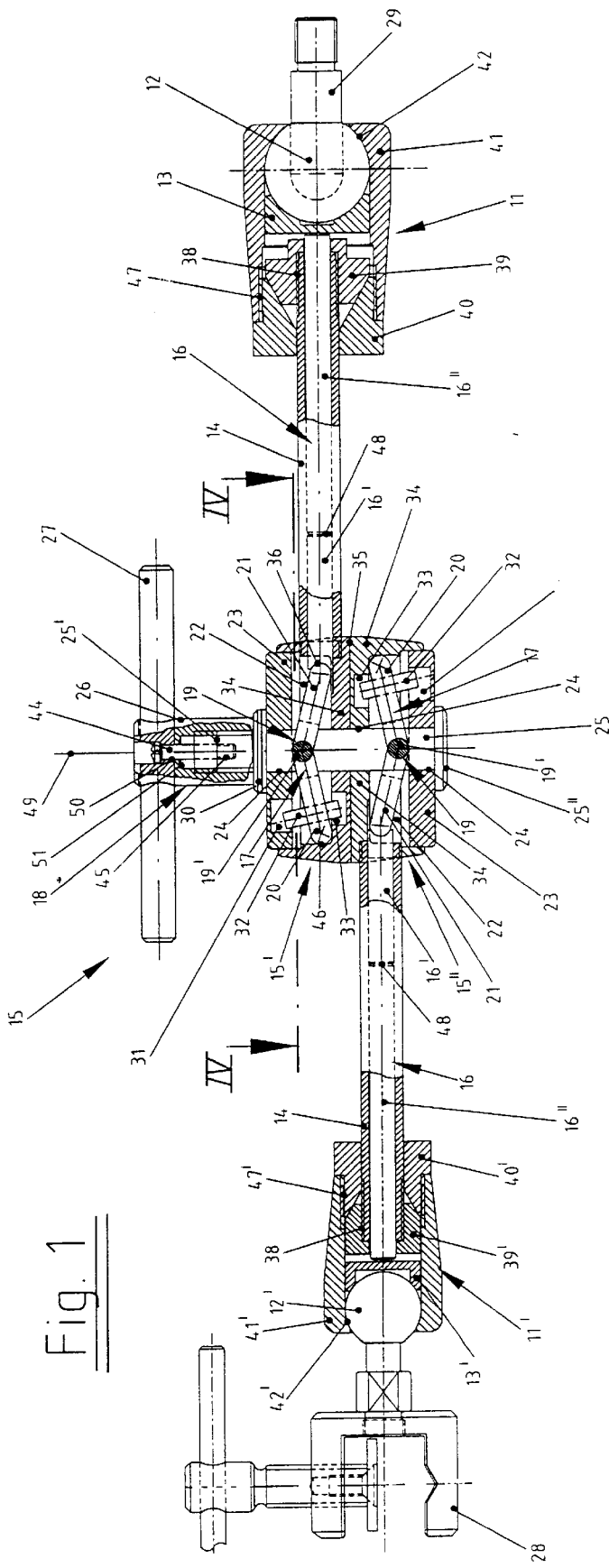
FIG. 1 a partly sectioned side view of a jointed support structure in accordance with the invention having two toggle lever mechanisms and two clamping jaw elements in the unclamped state.

In accordance with FIGS. 1, 1a, 2, 2a and 4, 4a, an actuating block 15 has two halves 15', 15" contacting one another with their bases along a contact plane 35 which each comprise a shell-like housing 34 (FIGS. 10, 10a, 11, 11a) having a substantially circular horizontal cross-section and a pressure plate 23 (FIGS. 8, 8a, 9, 9a) arranged displaceably therein. In each case, a recess is located between the pressure plates 23 and the housings 34 and a toggle lever mechanism 17 is accommodated therein comprising two toggle lever plates 20, 21 shown in detail in FIGS. 4 to 6 and a toggle lever joint 19 effective between them which is formed by two pressure rollers 19' which are accommodated in grooves 20", 21" which are provided in the straight sides 20', 21' of the toggle lever plates 20, 21.

The toggle lever plates 20 are arranged in the recesses 22 such that the one toggle lever 20 is supported with its bulge-like rounded end 46 on the peripheral margin of the housing 34, while the free end 37 formed like a bulge of the other toggle lever 21 is connected in a thrust transmitting manner to a groove 36 formed complementary thereto in the one face of a push rod 16 which is guided displaceably in a tube 14 branching transversely from the housing 34, extending perpendicular to the direction of movement of the toggle lever joint 19 and connected at the ends remote from the halves 15', 15" in each case to a clamping jaw element 11 which contains a clamping jaw 13 acted upon by the push rod 16 and a clamping member 12 formed as a ball, to which a screw clamp element 28 or a screw neck 29 is attached. The toggle lever plates 20, 21 are angled relative to each other both in the relaxed position (FIGS. 1, 1a, 2, 2a) and the stressed position (FIGS. 3, 3a) such that no self-locking occurs. The angle greater than 180° is located on the sides of the two toggle lever pairs facing away from one another.

The end of the connecting tube 14 remote from the actuating block 15 is provided with a male thread 38 onto which a respective conical nut 39, 39' is screwed which cooperates with a complementary ball sleeve nut 40, 40' such that a ball sleeve 41, 41' having a cup 42, 42' for the clamping ball 12, 12' and connected to the ball sleeve nut 40, 40' by a threaded connection 47, 47' makes a strong connection between the clamping ball 12, 12' and the connecting tube 14 when the clamping jaw 13, 13' is acted upon by the push rod 16. The ball sleeve 41, 41' has sections (not shown) at the side in the region of the clamping ball 12, 12' which allow the clamping balls 12, 12' to be pivoted with the tube neck 29 in both directions through around 90° around a vertical axis out of the position in accordance with FIG. 3. Furthermore, the clamping ball 12, 12' is pivotable around the axis of the push rod 16 in the unclamped state.

The push rod 16 is divided in two by it comprising a short inside piece 16' having the groove 36 and an outer longer piece 16" which connects the flat end face of the piece 16' flatly at 48 (FIGS. 1, 1a) and acts on the clamping jaw 13, 13' with its other end.

While the clamping jaw element 11, which is fastened to a support structure connected to the operating table via a screw neck, is made relatively solidly and firmly, because it has to bear not only the actuating block 15, but also the medical instruments and apparatus fastened to the other end, the clamping jaw element 11' provided at the opposite end is made considerably smaller and weaker because it only has to bear the weight of the attached medical instruments and apparatus via the screw clamp.

To actuate the toggle lever mechanism 17, a movement generating apparatus 18 is provided in the actuating block 15 and has a draw bolt 25 with a lower head 25" and an upper threaded end 25' extending through bores 24 in the pressure plates 23 and housings 34 forming the actuating block 15 and whose axis 49 extends perpendicularly to the push rods 16. Alternatively, a pneumatic or hydraulic pulling or pressing cylinder an eccentric clamping cam or similar could also be used for movement generation.

A threaded end 25' of the draw bolt 25 protrudes from the upper pressure plate 23 at the top and a nut element 26 is screwed thereon and can be turned by a transversely arranged T-bar 27. An upper plate arrangement 30 transmits the movement or force exerted by the nut element 26 onto the upper pressure plate 23, while the reaction force is transmitted by the lower head 25" of the draw bolt onto the lower pressure plate 23.

A movement limiting screw 44 is inserted through a bore 50 (FIGS. 1, 1a) in the upper region of the nut element 26 and is screwed into a coaxial threaded bore 45 of the draw bolt 25 up to a predetermined depth, whereby the nut element 26 can only be unscrewed from the draw bolt 25 until the head of the movement limitation screw 44 contacts the upper edge of the bore 50. In this way, the range of movement of the toggle lever joint 19 is limited in the relaxation direction.

Figure 2:
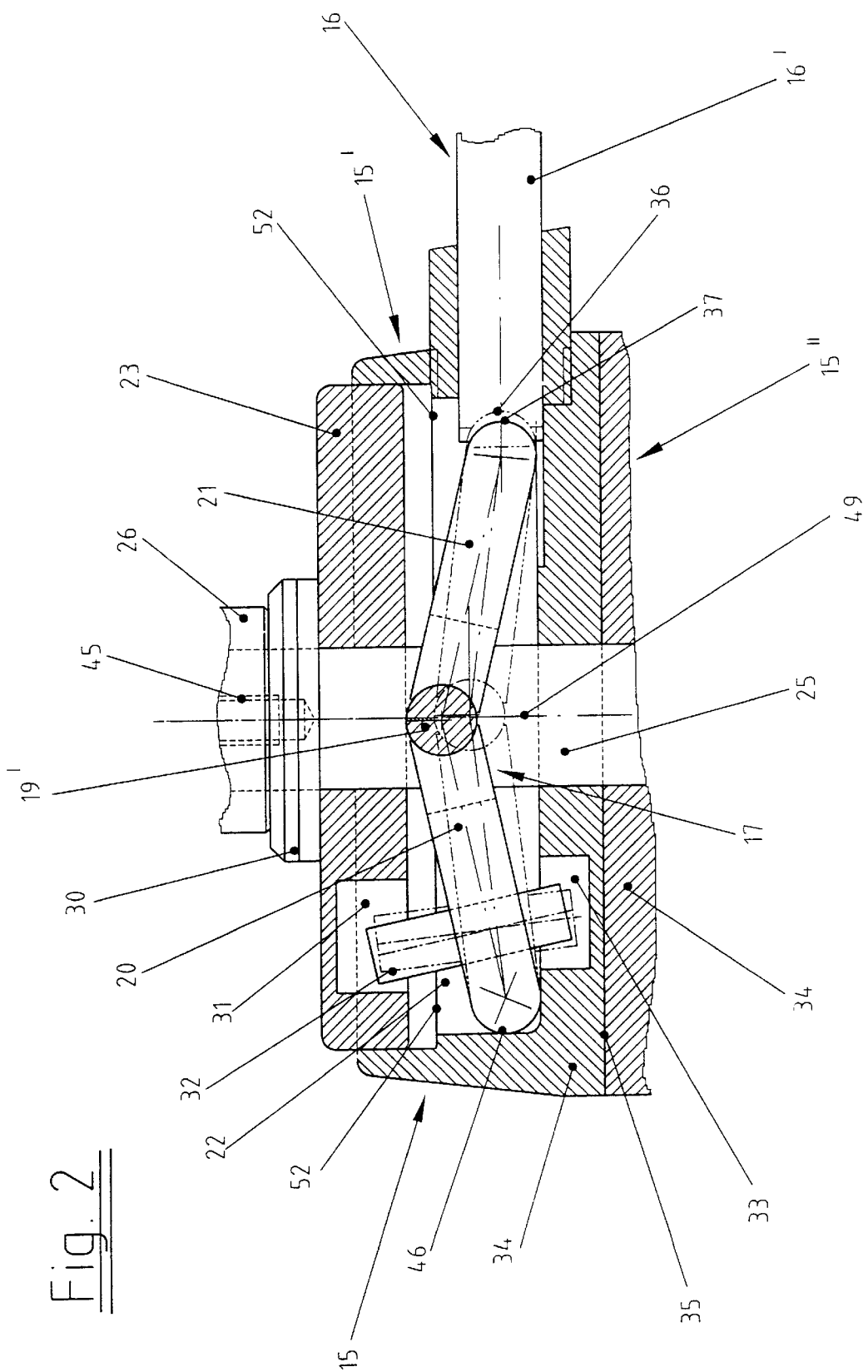
FIG. 2 an enlarged section of FIG. 1 in the region of the upper half of the actuating block, with the toggle lever mechanism additionally being indicated in the position corresponding to clamping by a chain-dotted line.
Figure 2A:
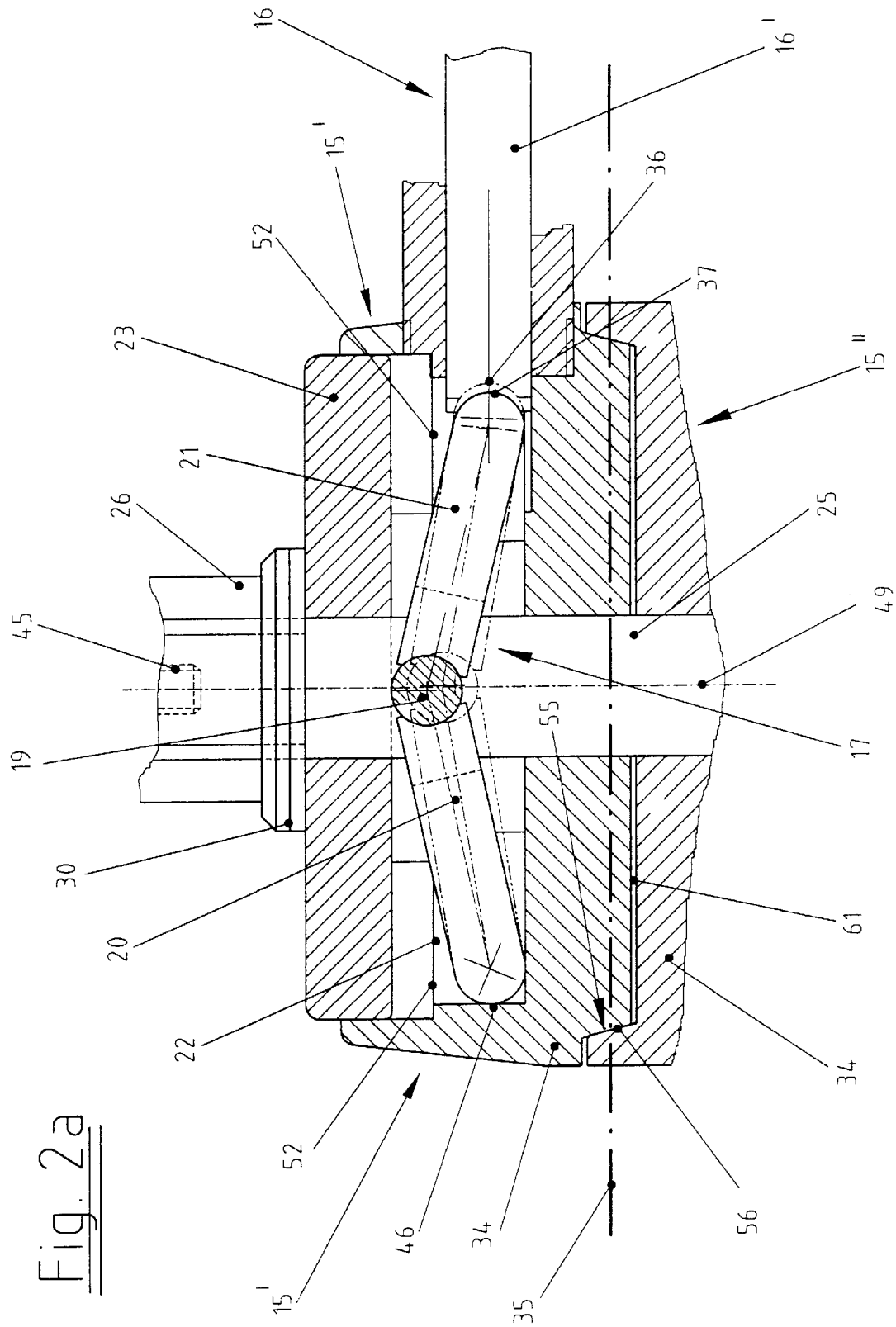
FIG. 2a an enlarged section of FIG. 1a in the region of the upper half of the actuating block, with the toggle lever mechanism additionally being indicated in the position corresponding to clamping by a chain-dotted line.

Furthermore, the nut element 26 has an annular step 51 above the upper face of the draw bolt 25 which could generally be used for the limitation of the movement of the nut element 26 in the direction of the toggle lever plate arrangement 20, 21. However, the embodiment particularly visible from FIGS. 2, 2a is preferred for this purpose, whereby the shell-shaped housings 34 have an annular step 52 projecting radially outwardly at a spacing from the base serving to receive the toggle lever in the most extended state and whereby this annular step 52 limits the inward movement of the pressure plates 23. In this way, too great an extension of the toggle lever mechanism 17 beyond the chain-dotted position in FIGS. 2, 2a is effectively avoided. It is therefore preferred when the movement of the toggle lever plates 20, 21 is only restricted in the direction of the toggle lever extension by the pressure plates 23 contacting the annular step 52 which is provided in the lower half 15" at the peripheral edge of the housing 34.

In the assembled state, central recesses 43 (FIGS. 4, 4a) of the toggle lever plates 20, 21 surround the draw bolt at a small distance in such a way that the toggle lever plates can move freely within the range provided under the action of the movement generating apparatus 18.

In accordance with FIGS. 4, 4a, one pressure roller 19' is accommodated in each of the grooves 20", 21" (FIGS. 7, 7a) on both sides of the draw bolt 25. The depth of the grooves 20", 21" is dimensioned so that there is no risk of the pressure rollers 19' jumping out even in the most angled state (FIGS. 1, 1a, 2, 2a, 7, 7a).

The pressure rollers 19' are acted upon from the top or bottom by the pressure plates 23, whereby a relatively wide-area force introduction and transmission is achieved.

In accordance with FIGS. 1, 2, 3, 4, 8, 9, 10, 11, the pressure plates 23 and the bases of the housings 34 have radial recesses 31 and 33 respectively which are axially opposite one another and in which a rotational security pin 32 (see also FIGS. 5, 6, 7) engages which extends from the toggle lever plate 20 into the recesses 31, 33 in opposite directions.

The dimensioning must be such that the movement of the toggle lever mechanism is not hindered by the arrangement of the rotational security pin 32 in the elongate hole-like recesses 31, 33 during clamping and unclamping, but a relative rotation is avoided between the pressure plates 23, the toggle lever mechanism 17 and the housings 34.

A relative rotation between the toggle lever plates 20, 21 and the housing 34 is avoided by the rotational security pin 32 engaging into the recesses 31, 33. Furthermore, the pressure plate cannot rotate relative to the housing or the toggle lever plates 20, 21 either due to the engagement of the rotational security pin 32 in the recess 31.

Another possibility of rotational security between the housing 32 and the toggle lever plates 20, 21 can be seen from FIGS. 1a, 2a, 3a, 4a, 5a, 6a, 7a, 8a, 9a, 10a, 1 1a. It can be seen in particular from FIGS. 4a, 5a, 6a, 8a, 9a, 11a and 13 that a relative rotation of the toggle lever plates 20, 21 relative to the housing 34 is not possible around the axis 49 can be achieved by a flat 54 at the sides of the toggle lever plates 20, 21 adjacent to the toggle lever joint 19 and by a counter-flat 54' opposite the flat 54 that.

The rotational security of the pressure plates 23 can be achieved in a corresponding manner in accordance with FIGS. 8a and 9a by the pressure plate also having a flat 54 opposite the counter-flat 54' of the housing 34 (FIGS. 8a, 9a).

While in the embodiment in accordance with FIGS. 1, 2, 3, 4, 5, 6, 7, 8, 9, 10, 11, the bases of the housings 34 contacting one another along the plane of symmetry 35 are arranged extending in a planar and perpendicular fashion with respect to the axis of rotation 49, in the embodiment in accordance with FIGS. 1a, 2a, 3a, 10a, the regions of the bases of the housings 34 contacting one another are made conically complementary to one another.

Figure 3A:
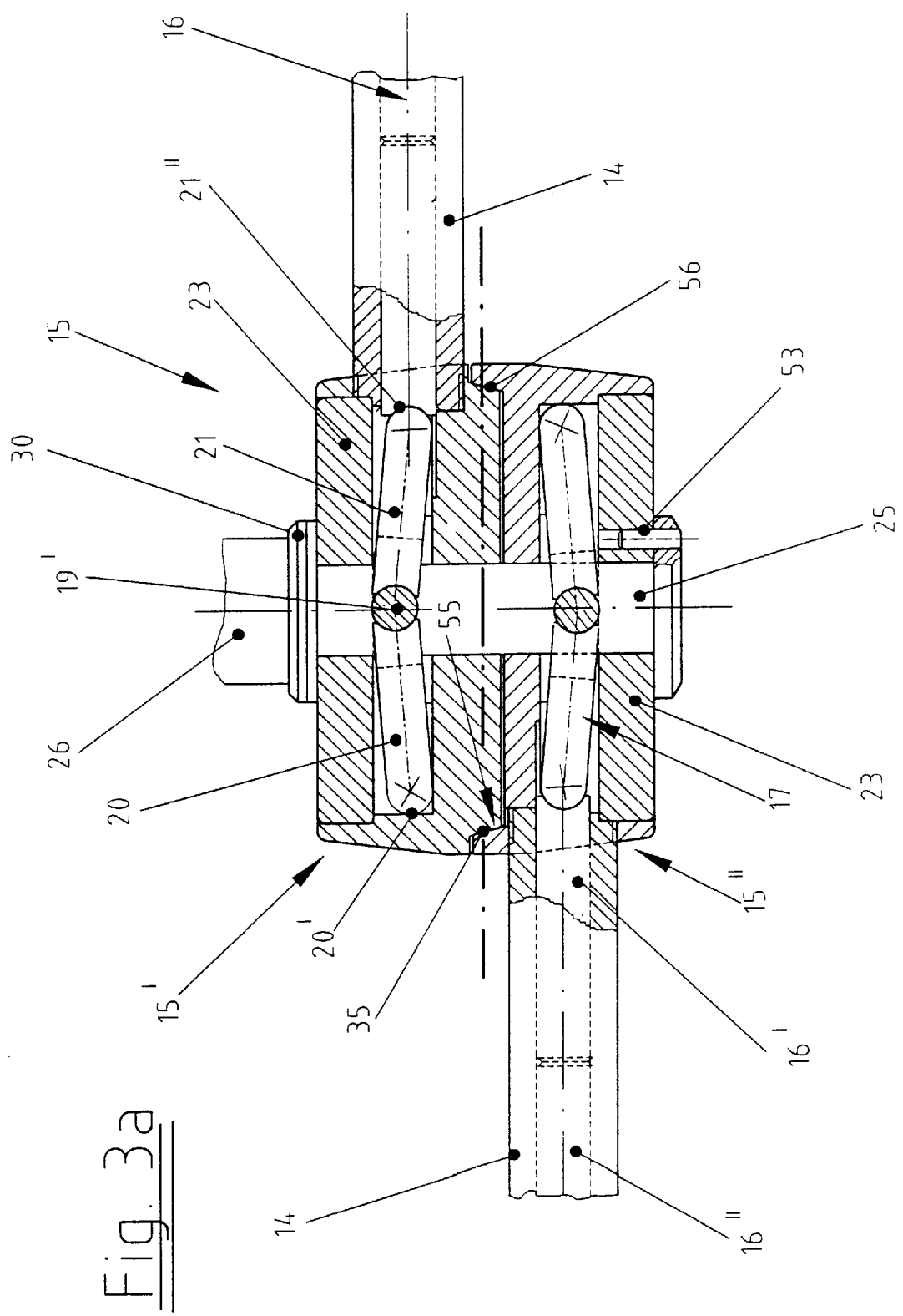
FIG. 3a a view of the middle part of the object of FIG. 1a in the clamped state.
Figure 7:
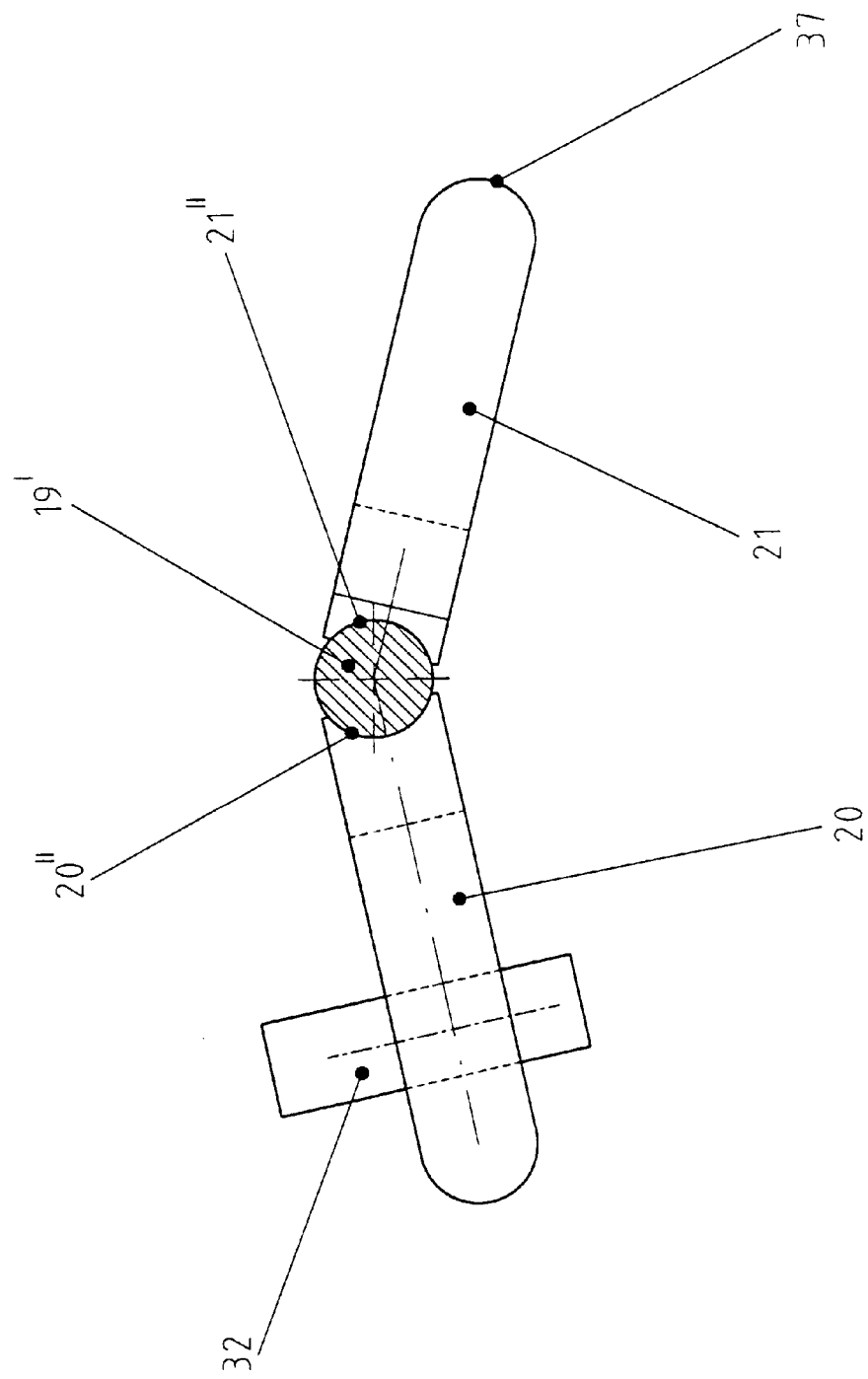
FIG. 7 a side view of the toggle lever plate arrangement of FIG. 5, with, however, the two toggle lever plates being shown in the state kinked relative to one another.
Figure 7A:
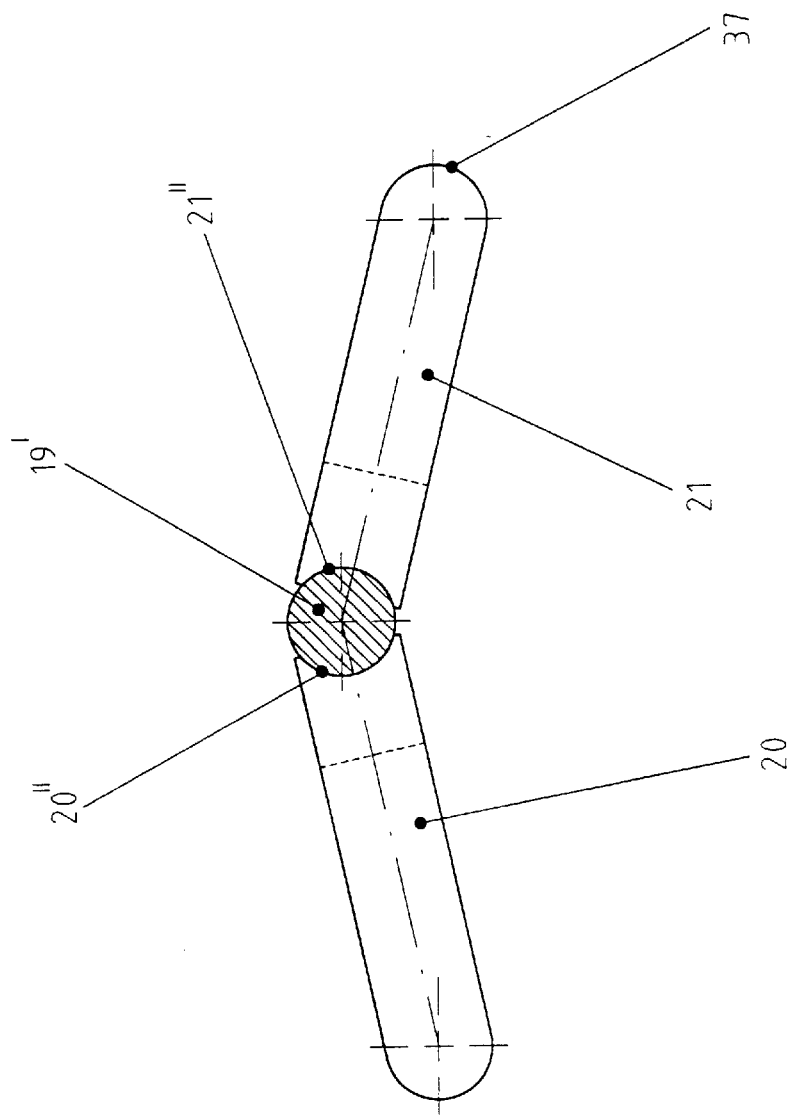
FIG. 7a a side view of the toggle lever plate arrangement of FIG. 5a, with, however, the two toggle lever plates being shown in the state kinked relative to one another.
Figure 8:
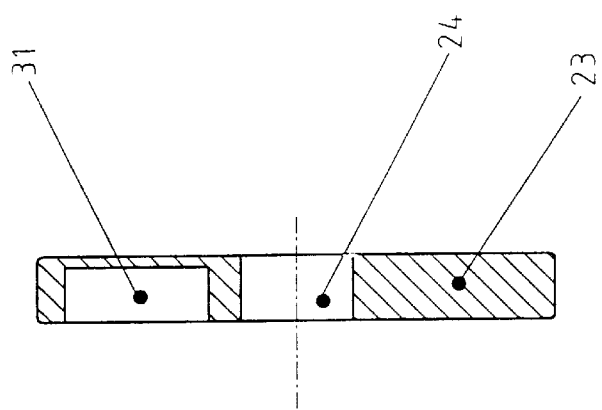
FIG. 8 a vertical section through a pressure plate of the embodiment in accordance with the invention according to FIGS. 1, 2, 3, 4, 5, 6 and 7.
Figure 9:
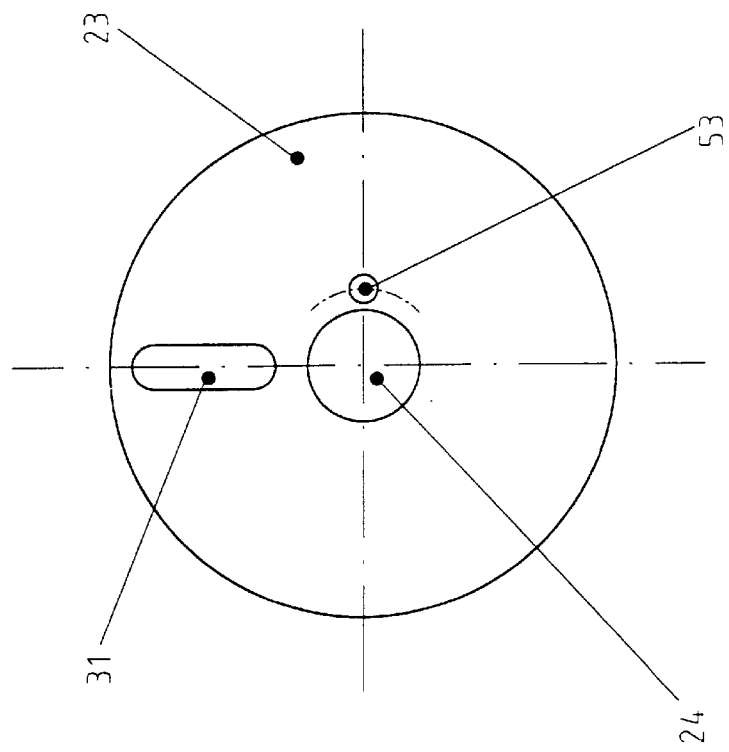
FIG. 9 a view of the object of FIG. 8 from the left.
Figure 10:
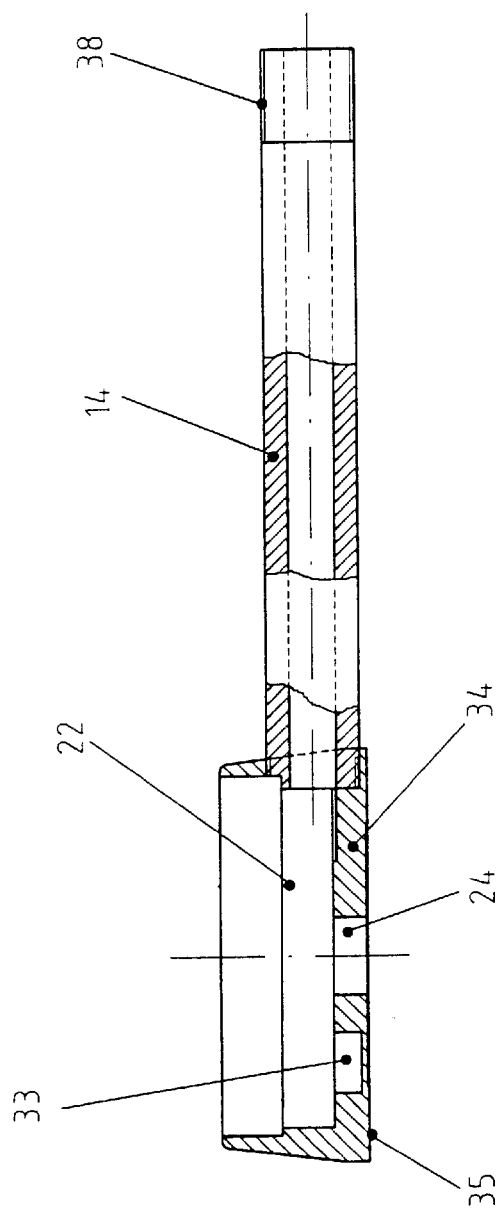
FIG. 10 a sectioned view of the housing belonging to the pressure plate in accordance with FIGS. 8 and 9 with a fitted connecting tube.
Figure 11:
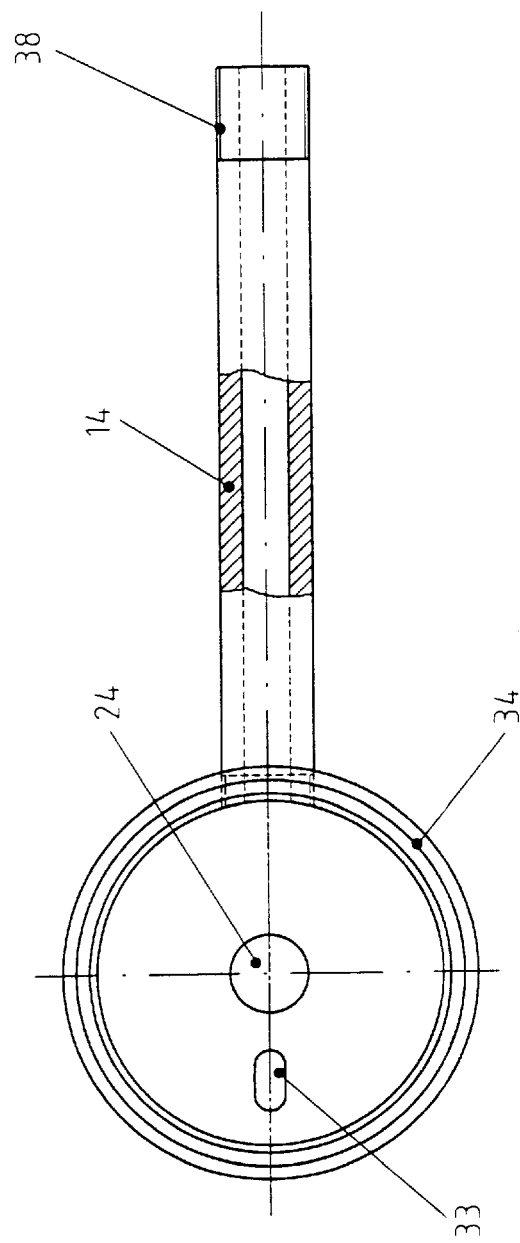
FIG. 11 a partly sectioned top view of the object of FIG. 10.
Figure 10A:
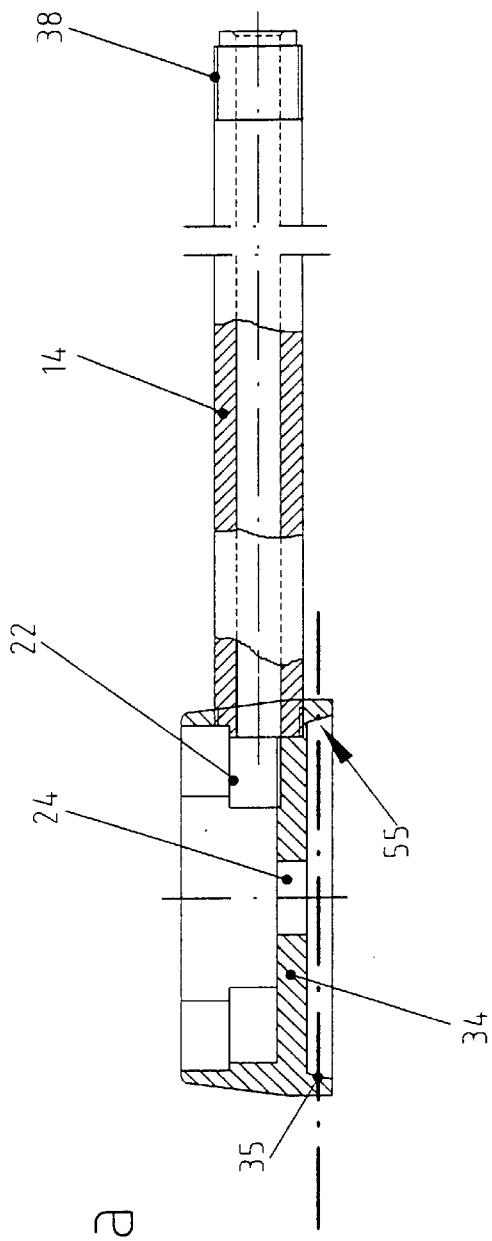
FIG. 10a a section view of the housing belonging to the pressure plate in accordance with FIGS. 8a and 9a with a fitted connecting tube.
Figure 11A:
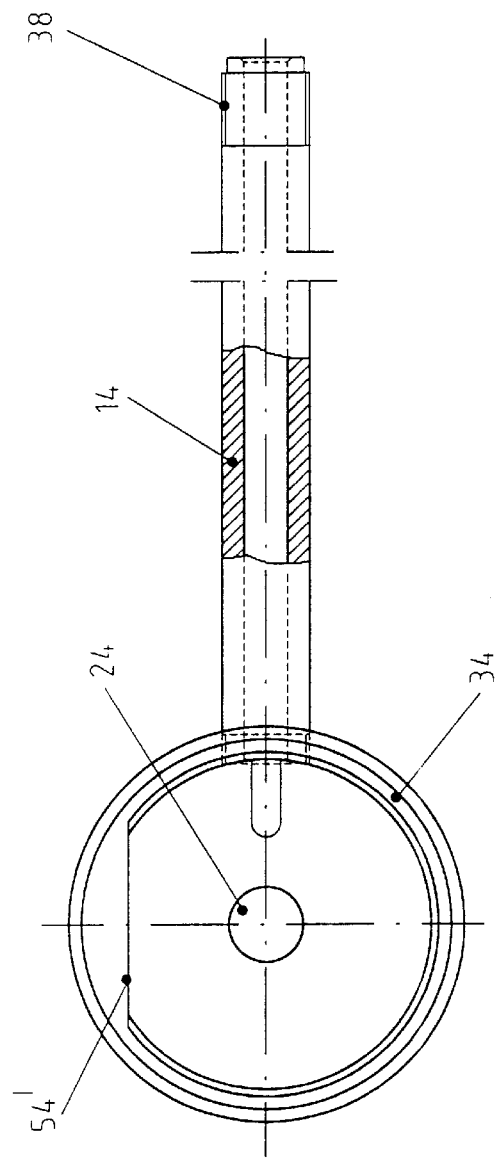
Figure 12:
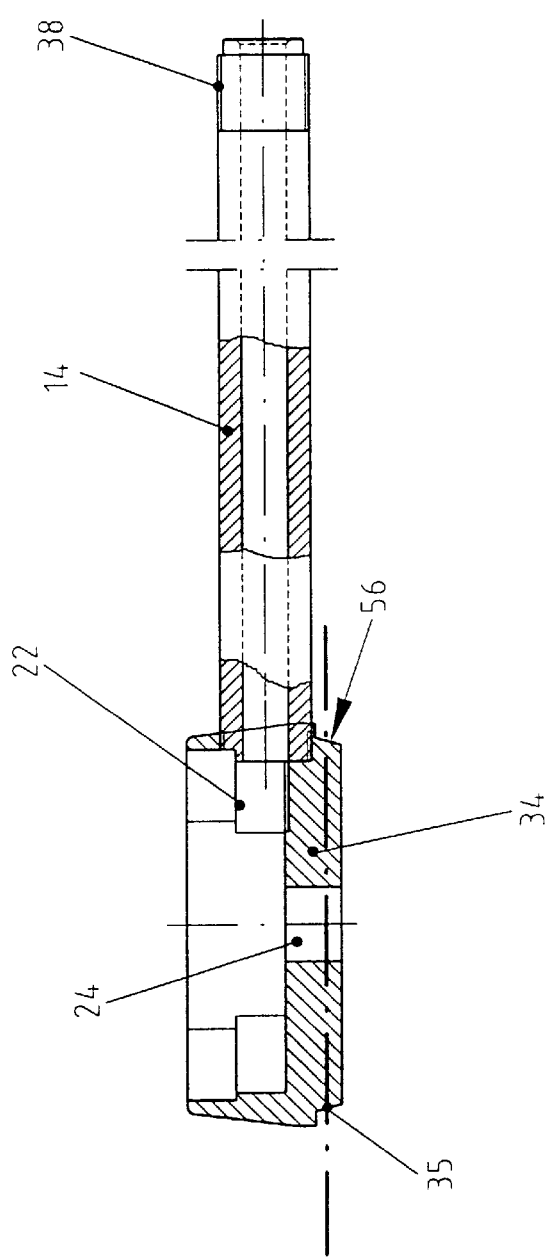
FIG. 12 a sectional view of the lower housing part to be assembled with the housing in accordance with FIG. 10a with a fitted connecting tube.
Figure 13:
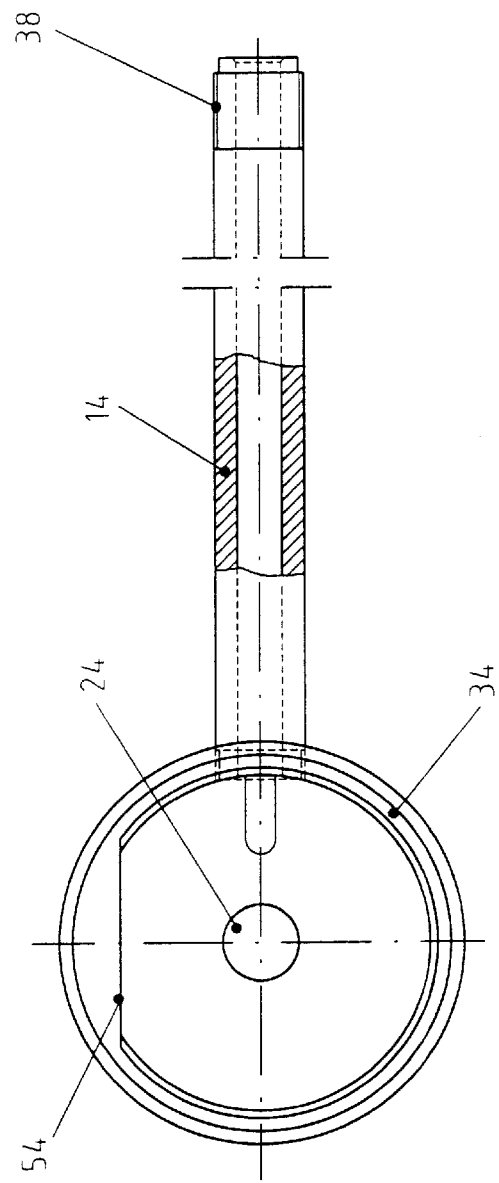
FIG. 13 a top view of the object of FIG. 12.
Figure 17:
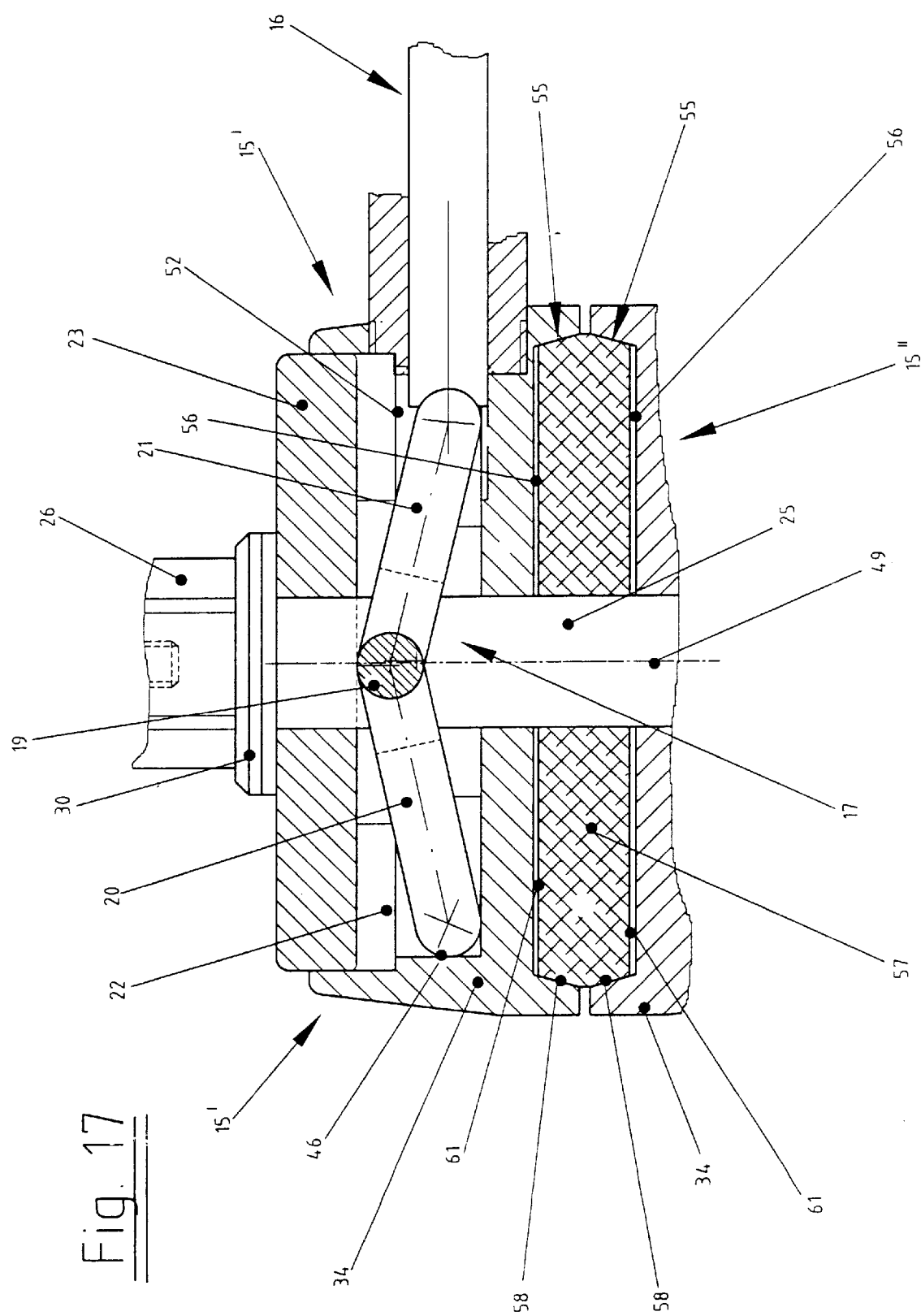

As can be seen in particular from FIGS. 2a and 3a, the upper housing 34 has a cone region 35 projecting towards the opposite housing 34 and engaging in a cone recess 56 complementary thereto in the base of the lower housing 34 arranged as a mirror image to the plane of symmetry 35, this being done in such a way that the cone surfaces of the cone region 55 and of the cone recess 56 contact one another. For this purpose, a gap 61 is located between the planar-end surfaces of the housings 34 (FIG. 2a).

In this way, the friction torque between the two housings 34 is increased in the region of the plane of symmetry 35 so that adequate clamping against a relative rotation of the two housings 34 is achieved even when there is only a low clamping of the two housings 34 against one another. The housings 34 are securely fixed in place in this manner despite the low tightening force. In addition, the cone form fixes the central joint in place radially. The radial forces which occur no longer have to be borne by the draw bolt 25, which represents a substantial improvement.

In the embodiment in accordance with FIGS. 14 to 17, the two housings 34 with base regions opposite one another each have a recess 59 with a peripheral cone surface 58 in the base region. A sliding insert 57, formed in accordance with FIGS. 15, 16, engages in this recess and is provided with cone surfaces 60 which are in a mirror-symmetrical position relative to the plane of symmetry 35 and which extend complementary to the peripheral cone surfaces 58 of the recesses 59. The dimensioning is such that the sliding insert 57 retains the two housings 34 at a low spacing to one another. The thickness of the sliding insert 57 is selected so that a gap 61 remains between the planar upper and lower surfaces, on the one end, and the opposing planar surfaces of the cone recesses 56. This gap 61 ensures that the force transmission is effected solely via the peripheral cone surfaces 58. The sliding insert 57 in accordance with FIGS. 15, 16 has a central bore 24' for the passage of the draw bolt 25.

The sliding insert 57 consists of a suitable sliding material which prevents scratching noise during the relative movement of the two housings 34 and any eroding of the contact surfaces without impairing the retaining function. For this purpose, the sliding insert 57 is preferably made of a suitable plastic material.

The assembly and the use of the support structure in accordance with the invention are as follows:

During assembly, the ball sleeve nut 40, 40' is the first element set on the tube 14. The ball sleeve nut 40, 40' is not initially tight, but rotatable and axially displaceable on the tube 14. Only when the conical nut 39, 39' is screwed on is the ball sleeve nut 40, 40' fixed axially in place in the direction of the clamping force.

If the ball sleeve 41, 41' with the clamping jaw 13, 13' and the clamping ball 12, 12' is now screwed onto the ball sleeve nut 40, 40', the threaded joint 47, 47' is created and a rotatable, but not axially displaceable joint is produced.

If then a clamping force acts on the clamping jaw 13, 13' via the toggle lever plates 20, 21 and the push rod 16, this has the effect that the clamping jaw element 11, 11' is fixed axially in place and against rotation.

When the clamping force is released, a rotation of the clamping jaw elements 11, 11' on the tube 14 is still possible without any axial play due to the length matching of the push rods 16. This clamping or the possibility of rotating without play of the clamping jaw elements contributes to providing a jointed support structure which allows maximum movement in the unclamped state and can be brought into a rigid state by a central actuation.

First, the tube neck 29 is attached vertically and longitudinally displaceably to an operating table, for example, via a support structure rod and a clamping block.

Subsequently, the surgical aids, e.g. a medical instrument or a medical apparatus, is clamped in the screw clamp arrangement 28.

Now, with the toggle lever mechanisms 17 still relaxed, the desired relative position is set between the tube neck 29 and the screw clamp arrangement 28, with the clamping balls 12, 12' being able to be adjusted largely freely within the cups 42, 42' or the clamping jaws 13, 13'. Furthermore, the connecting tubes 14 can be relative to one another in the desired manner angle-wise around the axis 49 of the actuating block 15.

As soon as the desired relative position of the individual components is reached, the T-bar 27 is rotated in the clockwise direction (FIGS. 1, 1a, 2, 2a) to move the toggle lever mechanisms 17 out of the relaxed position in accordance with FIGS. 1, 1a, into the clamping position in accordance with FIGS. 3, 3a, whereby the push rods 16 are displaced in the direction of the clamping jaws 13, 13' until the clamping jaws 13, 13' press the clamping balls 12, 12' firmly against the cups 42, 42'. At the same time, the two housings 34 are pressed firmly onto one another in the region of the plane of symmetry 35 so that a further relative rotation of these is no longer possible. The cone arrangement 55, 56 in accordance with FIGS. 2a, 3a and/or the sliding insert 57 in accordance with FIGS. 14 to 16 contribute in particular to this. By a suitable selection of the cone angle of the cone arrangement 55, 56 or the peripheral cone surface 58 a situation can be achieved in which a substantial resistance force against relative rotation of the two halves 15', 15" of the actuating block 15 is achieved even with relatively low clamping forces generated by the movement generating apparatus 18. The support structure is now ready for use.

To safely avoid the draw bolt 25 being turned when the nut element 26 is tightened, a rotational security pin 53 (FIGS. 1, 1a, 9, 9a) is attached between its head 25" and the lower pressure plate 23.

The clamping forces during the rotation of the nut element 26 in the clamping direction are transmitted from the nut element 26 to the pressure plates 23 via the plate arrangement 30 or the head 25" and from there to the pressure rollers 19' of the toggle lever mechanisms 17. In this way, substantial spreading forces are created which act on the push rods 16. Relatively large adjustment paths can be achieved in a space-saving manner by the use of a toggle lever mechanism 17 as the transmission. Such a substantial force amplification is achieved in the approximately extended state of the toggle lever 20, 21 (FIGS. 3, 3a) that a faultless clamping of the clamping balls 12, 12' is achieved which is also easily releasable again because the toggle levers 20, 21 return back to the relaxed position in accordance with FIGS. 1 or 1a (shown in solid lines) without any problem and without any risk of self-locking on release of the nut element 26. The adjustment of the toggle lever 20, 21 is possible with an extremely low effort force due to the arrangement in accordance with the invention.

The two axially displaced connecting tubes 14 pointing in opposite directions are pivotable relatively to one another through 360° around the axis 49 in the unclamped state and can be fixed in place at any relative angular position relative to one another by tightening the clamping nut 26, whereby the two halves 15', 15" of the actuating block 15 are pressed against one another.

The clamping jaw element 11, 11' allows the pivoting of the clamping balls 12, 12' through 180° around a vertical axis due to the lateral slots (not shown).

| Reference symbol list | |
|---|---|
| 11 | Large clamping jaw element |
| 11' | Small clamping jaw element |
| 12 | Large clamping member (clamping ball) |
| 12' | Small clamping member (clamping ball) |
| 13 | Large clamping jaw |

-continued

Reference symbol list

| | |
|---|---|
| 13' | Small clamping jaw |
| 14 | Connecting element (connecting tube) |
| 15 | Actuating block |
| 15' | Half |
| 15" | Half |
| 16 | Push rod |
| 16' | First piece of the push rod |
| 16" | Second piece of the push rod |
| 17 | Toggle lever mechanism |
| 18 | Movement generating device |
| 19 | Toggle lever joint |
| 19' | Pressure roller |
| 20 | Toggle lever plate |
| 20' | Straight side |
| 20" | Groove |
| 21 | Toggle lever plate |
| 21' | Straight side |
| 21" | Groove |
| 22 | Recess |
| 23 | Pressure plate |
| 24 | Bore |
| 24' | Bore |
| 25 | Draw bolt |
| 25' | Threaded end |
| 25" | Head |
| 26 | Nut element |
| 27 | T-bar |
| 28 | Screw clamping device |
| 29 | Screw neck |
| 30 | Plate arrangement |
| 31 | Recess |
| 32 | Rotational security pin |
| 33 | Recess |
| 34 | Housing |
| 35 | Contact plane |
| 36 | Groove |
| 37 | End |
| 38 | Outer thread |
| 39 | Conical nut |
| 39' | Conical nut |
| 40 | Ball sleeve nut |
| 40' | Ball sleeve nut |
| 41 | Ball sleeve |
| 41' | Ball sleeve |
| 42 | Cup |
| 42' | Cup |
| 43 | Recess |
| 44 | Movement limitation screw |
| 45 | Threaded bore |
| 46 | End |
| 47 | Threaded joint |
| 47' | Threaded joint |
| 48 | Connection point |
| 49 | Axis |
| 50 | Bore |
| 51 | Annular step |
| 52 | Annular step |
| 53 | Rotational security pin |
| 54 | Flat |
| 54' | Counter flat |
| 55 | Cone region |
| 56 | Cone recess |
| 57 | Sliding insert |
| 58 | Peripheral cone surface |
| 59 | Recess |
| 60 | Cone surface |
| 61 | Gap |

What is claimed is:

1. A jointed support structure for the adjustable attachment of objects, comprising:

at least one clamping jaw element having a clamping member, preferably made as a retaining ball, and a clamping jaw displaceable relatively thereto for the alternate clamping and unclamping of the clamping member;

at least one elongate connecting element connected at one end to the clamping element and preferably made as a tube;

an actuating block connected to the other end of the connecting element;

at least one push rod extending at least substantially parallel to the connecting element and connecting the clamping jaw and the actuating block in a thrust transmitting member;

a movement generating device generating a movement extending at least substantially perpendicularly to the push rod; and at least one toggle lever mechanism with a first toggle lever loaded by the movement generating device at one end and connected at its other end to an end of the push rod facing the actuating block in a thrust transmitting manner and transfering the movement generated by the movement generating device to the push rod, whereby the clamping jaw can alternately be brought into and out of clamping engagement with the clamping element, each toggle lever mechanism having a second toggle lever which is connected to the first toggle lever via a toggle lever joint and whose end remote from the toggle lever joint is pivotally supported on the actuating block, and the toggle lever joint of the toggle lever mechanism being moveable in the direction of the movement generated by the movement generating device.

2. A jointed supported structure in accordance with claim 1, wherein the toggle levers comprise semi-circular toggle lever plates whose straight sides are pivotally connected to one another from the toggle lever joint.

3. A jointed support structure in accordance with claim 2, wherein the straight sides of the toggle lever plates each have a groove into which two pressure rollers aligned with each other and complementary to the grooves are inserted to form the toggle lever joint.

4. A jointed support structure in accordance with claim 3, wherein the pressure rollers protrude over the associated ends of the toggle levers on the side facing the movement generating device and make the connection to the movement generating device.

5. A jointed support structure in accordance with claim 1, wherein the movement generating device comprises a screw mechanism.

6. A jointed support structure in accordance with claim 1, wherein the screw mechanism comprises a bolt and a nut element which can be turned relative to one another by a T-bar arranged transversely to the bolt and nut element.

7. A jointed support structure in accordance with claim 1, wherein the movement generating device comprises a hydraulic or pneumatic cylinder which applies the movement on the toggle lever joint.

8. A jointed support structure in accordance with claim 1, wherein the toggle levers are arranged in a recess of the actuating block.

9. A jointed support structure in accordance with claim 8, wherein the actuating block comprises at least one housing and at least one pressure plate slidable therein, the housing and the pressure plate having a circular horizontal cross-section and forming the recess therebetween, the pressure plate exerting pressure on the toggle lever joint when the movement generating device moves the pressure plate toward the toggle levers.

10. A jointed support structure in accordance with claim 9, wherein the housing and the pressure plate have a central bore extending at least substantially perpendicular to the push rod and having a draw bolt therein which in cooperation with a nut element comprises the movement generating device for the actuation of the toggle lever mechanism, the toggle levers being guided around the draw bolt by the provision of semi-circular recesses in the straight sides thereof.

11. A jointed support structure in accordance with claim 10, wherein a threaded end of the draw bolt projects outwardly from the pressure plate and the nut element is movable thereon to urge the pressure plate in the direction of the toggle lever joint using a pressure-distributing plate.

12. A jointed support structure in accordance with claim 11, wherein the nut element is moveable by a T-bar attached to and extending transversely to the axis of rotation of the nut element.

13. A jointed support structure in accordance with claim 1, wherein the actuating block comprises two halves having recesses extending in opposite directions, clamping jaw elements, connection elements, push rods and toggle lever mechanisms respectively arranged with regard to a plane of symmetry between the two housings, the housings and pressure plates being arranged coaxially to one another.

14. A jointed support structure in accordance with claim 13, wherein bases of the housings are planar and contact along the plane of symmetry.

15. A jointed support structure in accordance with claim 14, wherein the housings each have a circular tapering region concentric to the axis.

16. A jointed support structure in accordance with claim 13, wherein a slide insert having a central bore is arranged between the bases of the two housings and has tapering surfaces that are complementary to and cooperating with the circular tapering region of the two housings.

17. A jointed support structure in accordance with claim 16, wherein the slide insert is circular and is arranged concentrically to the axis.

18. A jointed support structure in accordance with claim 16, wherein recesses are provided in the bases of the housings to accommodate the slide insert, the tapering surfaces located at the periphery of the recesses.

19. A jointed support structure in accordance with claim 13, wherein one clamping jaw element supports a screw clamp device for the attachment of medical instruments and apparatus, and the other clamping jaw element supports a screw neck for attachment to a support.

20. A jointed support structure in accordance with claim 1, wherein the connecting element is a tube connected to the actuating block and to one of the clamping jaw elements and in which the push rod is displaceably guided.

21. A jointed support structure in accordance with claim 2, wherein a rotational security means is provided between the housing and the toggle lever mechanism.

22. A jointed support structure in accordance with claim 21, wherein at least one of the toggle levers has a rotational security pin extending substantially perpendicular to its longitudinal extension which engages into a corresponding recess elongate in a radial direction of the housing and into a corresponding recess elongate in a radial direction of the pressure plate, the pin preventing a relative twisting between the toggle lever mechanism and the housing and the pressure plate.

23. A jointed support structure in accordance with claim 1, wherein the push rod has a groove at its end facing the toggle lever mechanism into which the end of the associated toggle lever plate engages.

24. A jointed support structure in accordance with claim 1, wherein the push rod comprises a first portion and a second portion in contact, the first portion operably connected to the toggle lever mechanism and the second portion operably connected to the clamping jaw.

25. A jointed support structure in accordance with claim 1, wherein the connecting element has an end facing the clamping jaw element with a male thread on which a conical nut is screwed, on which a conical holder penetrated by the connecting element acts from the side of the actuating block, and onto which a housing is screwed which accommodates the clamping member, which has a cup for the pivoting of the clamping member and in which the clamping jaw is displaceable by the push rod in the direction of the cup.

26. A jointed support structure in accordance with claim 21, wherein at least one of the toggle lever plates has a flat at its periphery which abuts a corresponding counter-flat of the housing, the engagement of the flat of the at least one of the toggle lever plates with the counter-flat of the housing preventing relative twisting between the toggle lever mechanism and the housing.

27. A jointed support structure for the adjustable attachment of objects, comprising:
   at least one clamping jaw element having a clamping member, preferably made as a retaining ball, and a clamping jaw displaceable relatively thereto for the alternate clamping and unclamping of the clamping member;
   at least one elongate connecting element connected at one end to the clamping element and preferably made as a tube;
   an actuating block connected to the other end of the connecting element;
   at least one push rod extending at least substantially parallel to the connecting element and connecting the clamping jaw and the actuating block in a thrust transmitting member;
   a movement generating device generating a movement extending at least substantially perpendicularly to the push rod; and at least one toggle lever mechanism having first and second semi-circular toggle lever plates, the plates having groove shaped ends with at least one pressure roller therein to form a toggle lever joint about which the plates are pivotally connected, the first toggle lever being loaded by the movement generating device at one end and connected at its other end to the end of the push rod facing the actuating block in a thrust transmitting manner and transfering the movement generated by the movement generating device to the push rod, whereby the clamping jaw can alternately be brought into and out of clamping engagement with the clamping element, the second toggle lever being loaded by the movement generating device at one end and having an end remote from the toggle lever joint pivotally supported on the actuating block, the toggle lever joint of the toggle lever mechanism being moveable in the direction of the movement generated by the movement generating device.

28. A jointed support structure in accordance with claim 27, wherein the pressure rollers protrude over the associated ends of the toggle levers on the side facing the movement generating device and operable connected to the movement generating device.

29. An adjustable positioning device comprising:
   an adjustment head;
   an actuator mechanism for releasably clamping the adjustment head in one of a plurality of different positions;
   an operator of the actuator mechanism for generating an input force along a first axis;

a lever member of the actuator mechanism for being driven by the input force;

a cam assembly between the lever member and the operator for transmitting the input force from the operator to the lever member and generating a clamping force in a direction transverse to the input force axis; and a pressure member of the cam assembly aligned along the input force axis for receiving the input force from the operator, the aligned pressure member being pivotally connected to the lever member for pushing the lever member in the transverse direction to maximize the clamping force that fixes the head in one of the plurality of different positions.

30. An adjustable positioning device in accordance with claim 29, including a housing having internal space in which the lever member is disposed with the lever member maximized in length while keeping sizing of the cavity to a minimum via alignment of the pressure member pivotally connected to the lever member along the input force axis.

31. An adjustable positioning device in accordance with claim 30, wherein the housing has a wall extending along the internal space and another lever member is positioned in the housing internal space and is pivotably connected to the pressure member, the other lever member engaging the wall of the housing for pushing the pressure member and the lever member in the transverse direction.

32. An adjustable positioning device in accordance with claim 29, wherein the actuator mechanism includes a socket for receiving the adjustment head and a clamping jaw slidable within the socket for selectively clamping the adjustment head in one of the plurality of different positions in the socket, and a transmission shaft extending between the lever member and the clamping jaw, the lever member pushing the transmission shaft in the transverse direction when the input force is applied to the operator to slide the clamping jaw within the socket to clamp the adjustment head between the socket and the clamping jaw with the clamping force.

33. An adjustable positioning device in accordance with claim 29 wherein the pressure member comprises a pressure roller which is aligned along the input force axis prior to receipt of the input force and shifts transversely thereto upon application of the input force.

34. The adjustable positioning device of claim 33 wherein the cam assembly includes a plate member shifted by the operator for pushing the pressure roller transversely away from the input force axis.

* * * * *